(12) United States Patent
Balakrishnan et al.

(10) Patent No.: US 8,369,111 B2
(45) Date of Patent: Feb. 5, 2013

(54) ULTRA LOW STANDBY CONSUMPTION IN A HIGH POWER POWER CONVERTER

(75) Inventors: Balu Balakrishnan, Saratoga, CA (US); David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 262 days.

(21) Appl. No.: 12/848,617

(22) Filed: Aug. 2, 2010

(65) Prior Publication Data

US 2012/0026759 A1    Feb. 2, 2012

(51) Int. Cl.
  *H02M 3/335* (2006.01)
  *H02H 7/122* (2006.01)
(52) U.S. Cl. ............... 363/21.15; 363/21.12; 363/21.16; 363/21.17; 363/56.09; 363/56.1; 363/97; 363/131
(58) Field of Classification Search ............... 363/21.12, 363/21.15, 21.16, 21.17, 56.09, 56.1, 97, 363/131
See application file for complete search history.

(56) References Cited

U.S. PATENT DOCUMENTS

| | | | |
|---|---|---|---|
| 5,321,337 A | 6/1994 | Hsu | |
| 5,449,988 A | 9/1995 | Gurstein et al. | |
| 5,694,007 A | 12/1997 | Chen | |
| 5,703,764 A * | 12/1997 | Hermann et al. | 363/21.16 |
| 5,719,473 A | 2/1998 | Huber et al. | |
| 5,790,395 A | 8/1998 | Hagen | |
| 5,834,924 A | 11/1998 | Konopka et al. | |
| 5,872,430 A | 2/1999 | Konopka | |
| 5,920,186 A | 7/1999 | Ninh et al. | |
| 5,973,419 A | 10/1999 | Kruppa et al. | |
| 5,982,639 A * | 11/1999 | Balakirshnan | 363/21.18 |
| 5,991,175 A | 11/1999 | Liu | |
| 6,297,979 B1 | 10/2001 | Tse | |
| 6,559,623 B1 | 5/2003 | Pardoen | |
| 6,703,889 B2 | 3/2004 | Dodson, III | |
| 6,714,429 B2 | 3/2004 | Phadke | |
| 6,967,472 B2 | 11/2005 | Balakrishnan et al. | |
| 7,218,537 B2 | 5/2007 | Sherwood et al. | |
| 7,355,368 B2 | 4/2008 | Salato et al. | |
| 7,471,527 B2 * | 12/2008 | Chen | 363/65 |
| 7,508,641 B2 | 3/2009 | Ball et al. | |
| 7,535,691 B2 | 5/2009 | Mayell | |
| 7,626,373 B2 | 12/2009 | Mayell | |
| 7,760,479 B2 | 7/2010 | Garrett | |
| 7,760,524 B2 | 7/2010 | Matthews | |
| 8,179,698 B2 * | 5/2012 | Jang et al. | 363/17 |
| 2011/0103104 A1 * | 5/2011 | Zhan et al. | 363/21.17 |

* cited by examiner

*Primary Examiner* — Bao Q Vu
(74) *Attorney, Agent, or Firm* — Blakely Sokoloff Taylor & Zafman LLP

(57) ABSTRACT

A power converter with low power consumption during a standby operating condition. An example power controller includes a main converter coupled to a dc input of the power converter to control a transfer of energy from the dc input of the power converter to a main output of the power converter. A standby converter is also included and is coupled to the dc input of the power converter to control a transfer of energy from the dc input of the power converter to a standby output of the power converter during a standby operating condition of the power converter. A standby circuit is also included and is coupled to the dc input of the power converter and coupled to the main converter. The standby circuit decouples the main converter from the dc input of the power converter during the standby operating condition of the power converter.

21 Claims, 4 Drawing Sheets

ULTRA LOW STANDBY CONSUMPTION IN A HIGH POWER POWER CONVERTER

BACKGROUND INFORMATION

1. Field of the Disclosure

The present invention relates generally to power converters, and more specifically, the invention relates to reducing power consumption of a high power power converter during a standby operating condition.

2. Background

Electrical devices require power to operate. Power is typically delivered through a wall outlet as high-voltage ac power. A device generally referred to as a switching power supply is typically used to convert the ac power from the wall outlet to dc power that is supplied to the electrical device. The power supply typically remains plugged into the wall outlet, even when the electrical device is not in use. A consequence of the power supply remaining plugged into the wall outlet is that power is typically consumed by the power supply whether or not the electrical device is turned on or off.

In order to minimize energy consumption in power supplies like the one described above, a bulky relay is typically used on the input of the power supply to disconnect the main power supply from the ac line while using a small standby power supply to provide system standby power.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for reducing power consumption of a high power power converter during a standby operating condition are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1A:
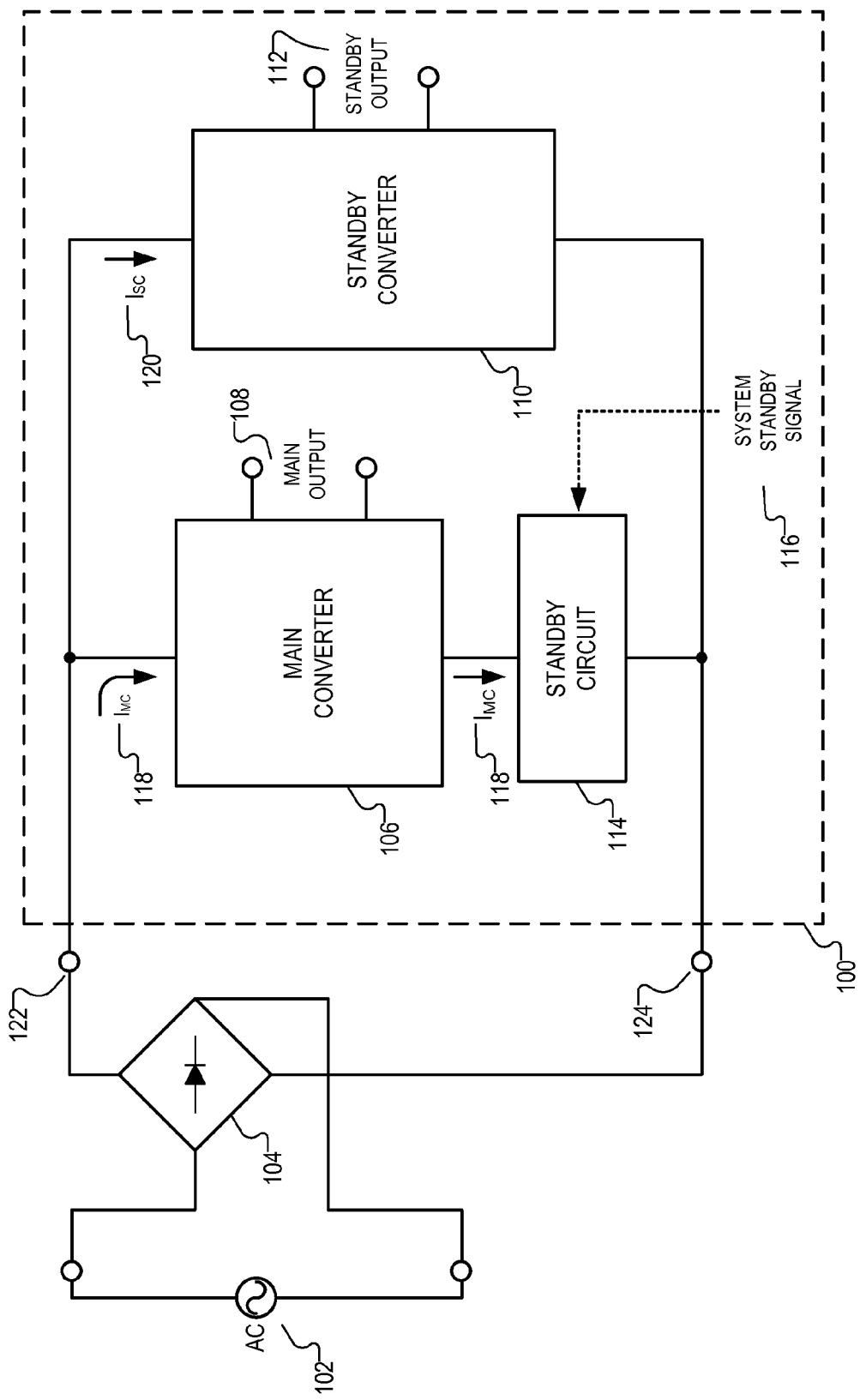
FIG. 1A is a schematic showing generally an example of a power converter including a including a main converter, a standby converter and a standby circuit in accordance with the teachings of the present invention.

FIG. 1A is a schematic showing generally a power supply including a rectifier 104 coupled to an ac source 102. An example power converter 100 includes a dc input having input terminals 122 and 124 coupled to rectifier 104 as shown. In the illustrated example, power converter 100 includes a main converter 106 coupled to the input of the power converter to control a transfer of energy from the dc input of the power converter to a main output 108 of the power converter during a normal operating condition of the power converter. A standby converter 110 is also included and is coupled to the dc input of the power converter to control a transfer of energy from the dc input of the power converter to a standby output 112 of the power converter during the normal operating condition and during a standby operating condition of the power converter. Power converter 100 also includes a standby circuit 114 coupled to the dc input of the power converter and coupled to the main converter 106 as shown. It is appreciated that main converter 106 and or standby converter 110 could be dc-dc or dc-ac converters while still benefiting from the teachings of the present invention.

In one example, the standby circuit 114 in response to a system standby signal 116 decouples the main converter 106 from the dc input of the power converter during the standby operating condition of the power converter. As a result, current $I_{MC}$ 118 through main converter 106 from the input of the power converter is disabled and is therefore substantially zero during the standby operating condition of the power converter in accordance with the teachings of the present invention. In contrast, current $I_{SC}$ 120 through standby converter 110 continues to flow from the input of the power converter during the normal operating condition as well as during the standby operating condition of the power converter in accordance with the teachings of the present invention.

Figure 1B:
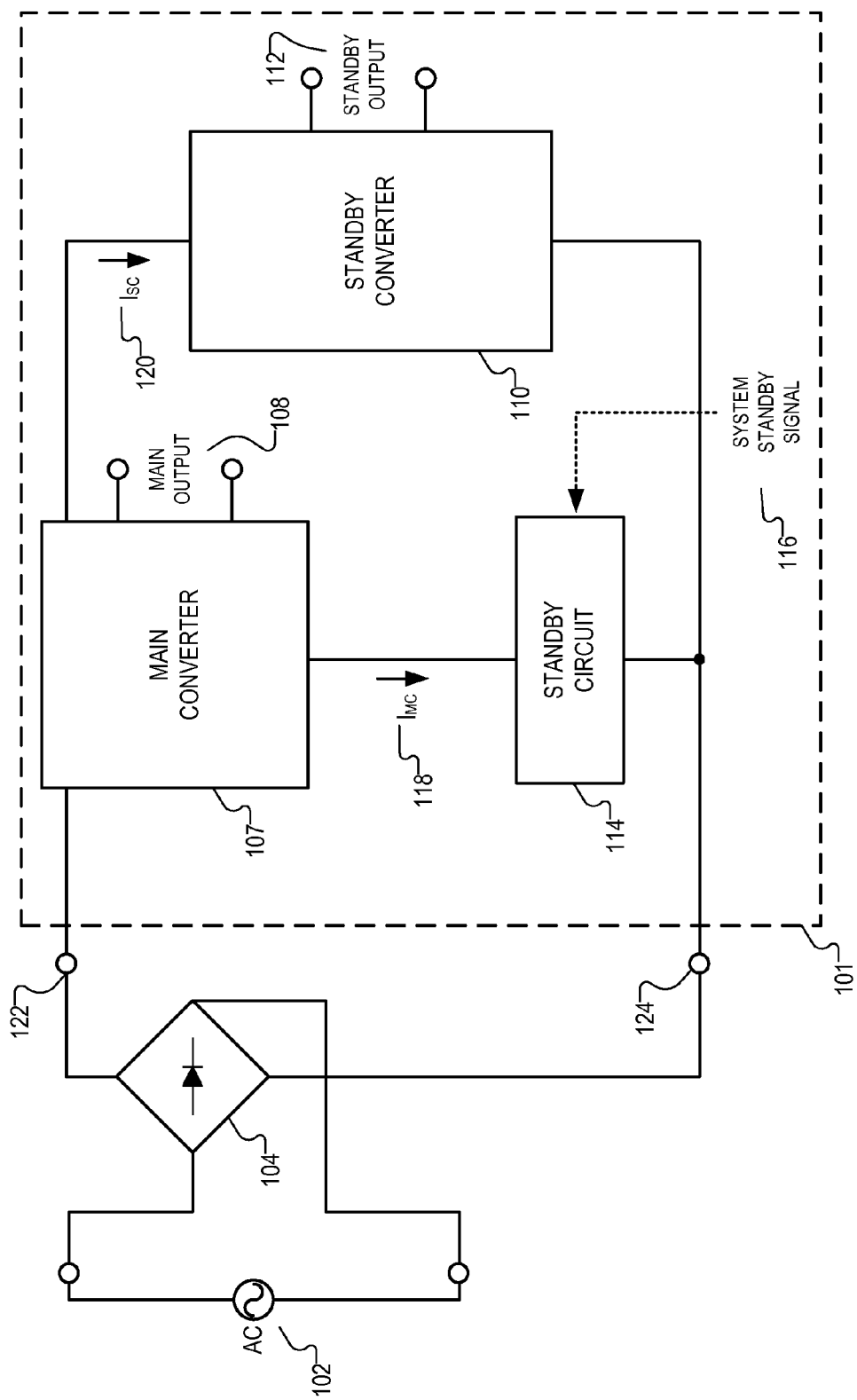
FIG. 1B is a schematic showing generally another example of a power converter including a including a main converter, a standby converter and a standby circuit in accordance with the teachings of the present invention.

FIG. 1B is a schematic showing generally another power supply including rectifier 104 coupled to ac source 102. Example power converter 101 of FIG. 1B shares may similarities with example converter 100 of FIG. 1A as it includes also a dc input having input terminals 122 and 124 coupled to rectifier 104 as shown. In the illustrated example, power converter 101 includes a main converter 107 coupled to the dc input of the power converter to control a transfer of energy from the input of the power converter to main output 108 of the power converter. A standby converter 110 is also included and is coupled to the dc input of the power converter to control a transfer of energy from the input of the power converter to a standby output 112 of the power converter during a normal operating condition and a standby operating condition of the power converter. In the example illustrated in FIG. 1B, standby converter 110 is coupled to the dc input of power converter 101 through main converter 106. Power converter 101 also includes a standby circuit 114 coupled to the dc input of the power converter and coupled to the main converter 107 as shown.

In one example, the standby circuit 114 in response to a system standby signal 116 decouples the main converter 107 from the DC input of the power converter during the standby operating condition of the power converter. This results in current $I_{MC}$ 118 through main converter 107 from the input of the power converter to be disabled and therefore be substantially zero during the standby operating condition of the power converter in accordance with the teachings of the present invention. In contrast, current $I_{SC}$ 120 through standby converter 110 continues to flow from the input of the power converter during the normal operating condition as well as during the standby operating condition of the power converter in accordance with the teachings of the present invention.

Figure 2:
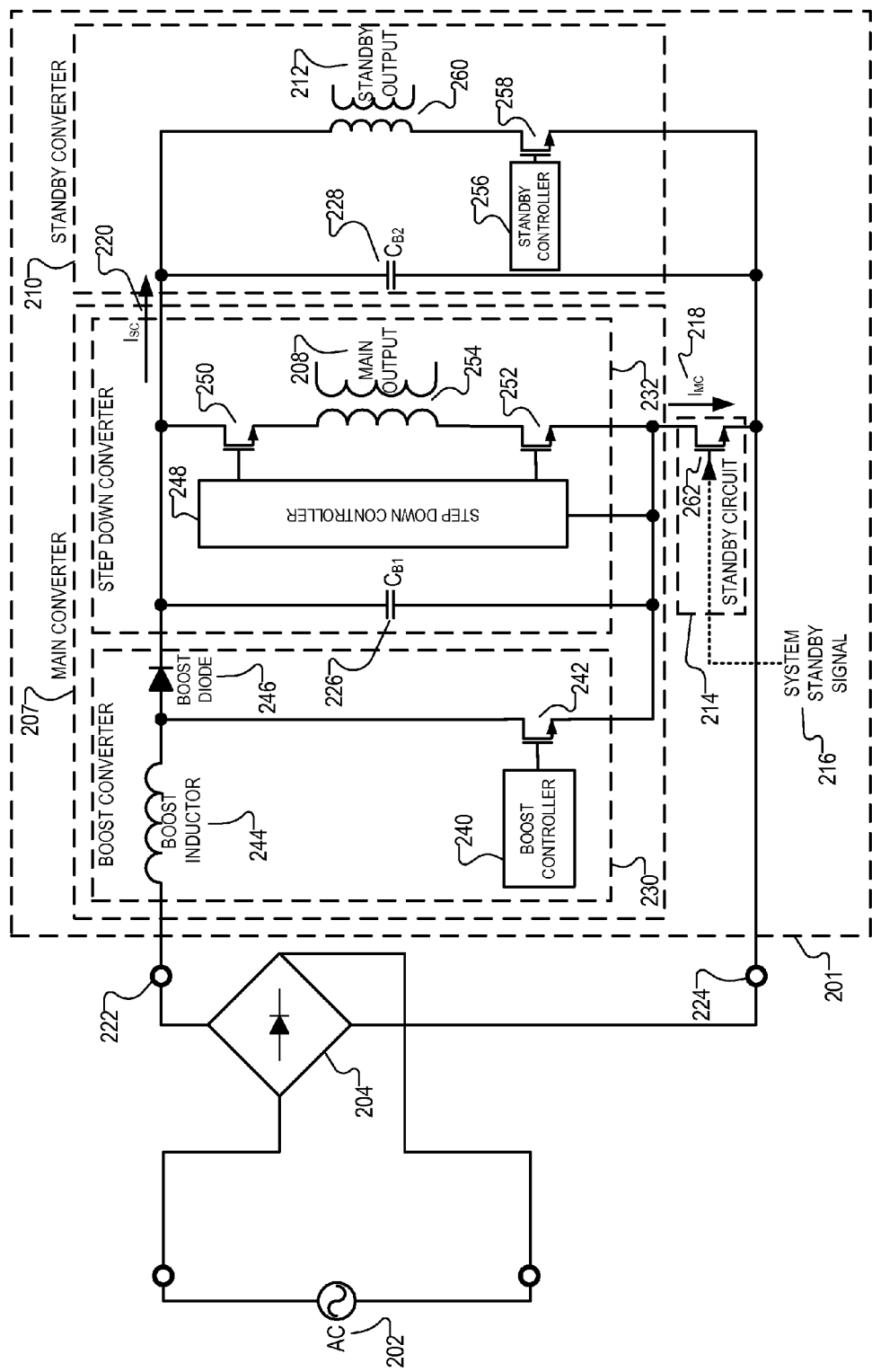
FIG. 2 is a schematic showing generally increased detail of an example of a power converter including a including a main converter, a standby converter and a standby circuit in accordance with the teachings of the present invention.

FIG. 2 is a schematic showing generally increased detail of an example of a power converter 201 including a including a main converter 207, a standby converter 210 and a standby circuit 214 in accordance with the teachings of the present invention. As shown in the depicted example, power converter 201 includes a dc input having input terminals 222 and 224 coupled to receive a dc signal from a rectifier 204, which is coupled to rectify an ac signal received from ac source 202. In one example, input terminal 222 may be considered as corresponding to an upper dc rail of the input, while input terminal 224 may be considered as corresponding to a lower dc rail of the input.

In various examples, main converter 207 may include one or more stages such as for example but not limited to a power factor correction (PFC) converter stage, a boost converter stage, a step down converter stage, or the like. To illustrate, in the particular example illustrated in FIG. 2, main converter 207 includes a boost converter 230 coupled to a step down converter 232 as shown. As shown in the illustrated example, boost converter 230 includes a boost inductor 244 coupled to dc input terminal 244, a boost diode and a switch 242 as shown. A boost controller 240 is coupled control the switching of switch 242. As shown in the depicted example, boost converter 230 of main converter 207 is coupled to dc input terminal 224 through standby circuit 214 as shown.

In one example, step down converter 232 includes switches 250 and 252 coupled to an input winding of an energy transfer element 254 as shown. In the illustrated example, the main output 208 of power converter 201 is generated across the output winding of the energy transfer element 254. In the illustrated example, step down converter 232 also includes step down controller 248 to control the switching of switches 250 and 252 to control the transfer of energy from the input of the power converter 201 to main output 208 of power converter 201. In the illustrated example, main bulk capacitor $C_{B1}$ 226 is also included in step down converter 232. As shown in the illustrated example, step down converter 232 of main converter 207 is coupled to input terminal 224 through standby circuit 214 as shown.

It is appreciated that in other examples, main converter 207 could includes a single power conversion stage or alternatively could include more than two power conversion stages rather than the two stage example, including boost converter 230 and step down converter 232, described here for explanation purposes. Furthermore it is appreciated that the type of power conversion circuits within main converter 207 could vary while still benefiting from the teachings of the present invention. For example, step down converter 232 could be configured as a flyback converter, a full bridge converter, a buck converter or a forward converter while still benefiting from the teachings of the present invention. Likewise power conversion stage 230 could be configured as a buck converter or other power conversion topology while still benefiting from the teachings of the present invention.

As shown in the example illustrated in FIG. 2, power converter 201 also includes standby converter 210, which is coupled to input terminal 222. In the specific example illustrated in FIG. 2, standby converter 210 is coupled to the input terminal 222 through main converter 207. It is appreciated that in another example, standby converter may be coupled directly to input terminal 222. In one example, standby converter 210 includes switch 258 coupled to an input winding of an energy transfer element 260 as shown. In the illustrated example, the standby output 212 of power converter 201 is generated across the output winding of the energy transfer element 260. In the illustrated example, standby converter 210 also includes standby controller 256 to control the switching of switch 258 to control the transfer of energy from the input of the power converter 201 to standby output 212 of power converter 201. In the illustrated example, standby bulk capacitor $C_{B2}$ 228 is also included in step down converter 232. As shown in the illustrated example, standby converter 210 is directly coupled to input terminal 224 as shown.

As shown in the illustrated example, power converter 201 also includes standby circuit 214 that includes a switch 262 which is coupled to main converter 207 and input terminal 224 of the dc input of power converter 201 as shown. As shown in the depicted example, switch 262 is also coupled to receive a system standby signal 216, which indicates a normal operating condition or a standby operating condition of power converter 201. During a normal operating condition of power converter 201, main converter 207 is coupled to dc input terminal 224 through switch 262 in response to system standby signal 216 as shown. However, during a standby operating condition of the power converter 201, switch 262 decouples main converter 207, including main bulk capacitor $C_{B1}$ 226, from input terminal 224 in response to system standby signal 216. As a result, substantially all current $I_{MC}$ 218 through the main converter 207 from the input of the power converter is disabled during a standby operating condition of the power converter 201. However, during normal operation, substantially all current $I_{MC}$ 218 through the main converter 207 from the input of the power converter 201 is allowed to flow.

Since standby converter 210 is not coupled to the dc input of the power converter 201 through standby circuit 214, standby converter 210, including standby bulk capacitor $C_{B2}$ 228, remains coupled to input terminal 224 during the standby operating condition. As a result, substantially all of the current $I_{SC}$ 220 through the standby converter 210 from the input of the power converter 201 is allowed to flow during both the normal operating condition as well as during the standby operating condition of power converter 201. As can be appreciated, by preventing the flow of current $I_{MC}$ 218 through main converter 207 from the input of the power converter 201 during a standby operating condition, the power consumption of power converter 201 is substantially reduced.

In the illustrated example, with the total bulk capacitance of power converter 201 is split as shown among the main bulk capacitor $C_{B1}$ 226 and standby bulk capacitor $C_{B2}$ 228 components. In one example, the capacitance value of standby bulk capacitor $C_{B2}$ 228 is designed to be sufficient for use by standby converter 210 during the standby operating condition and the capacitance value of main bulk capacitor $C_{B1}$ 226 is designed such that the combined capacitance of bulk capacitor $C_{B1}$ 226 and standby bulk capacitor $C_{B2}$ 228 is sufficient for main converter 207 during the normal operating condition of power converter 201.

Figure 3:
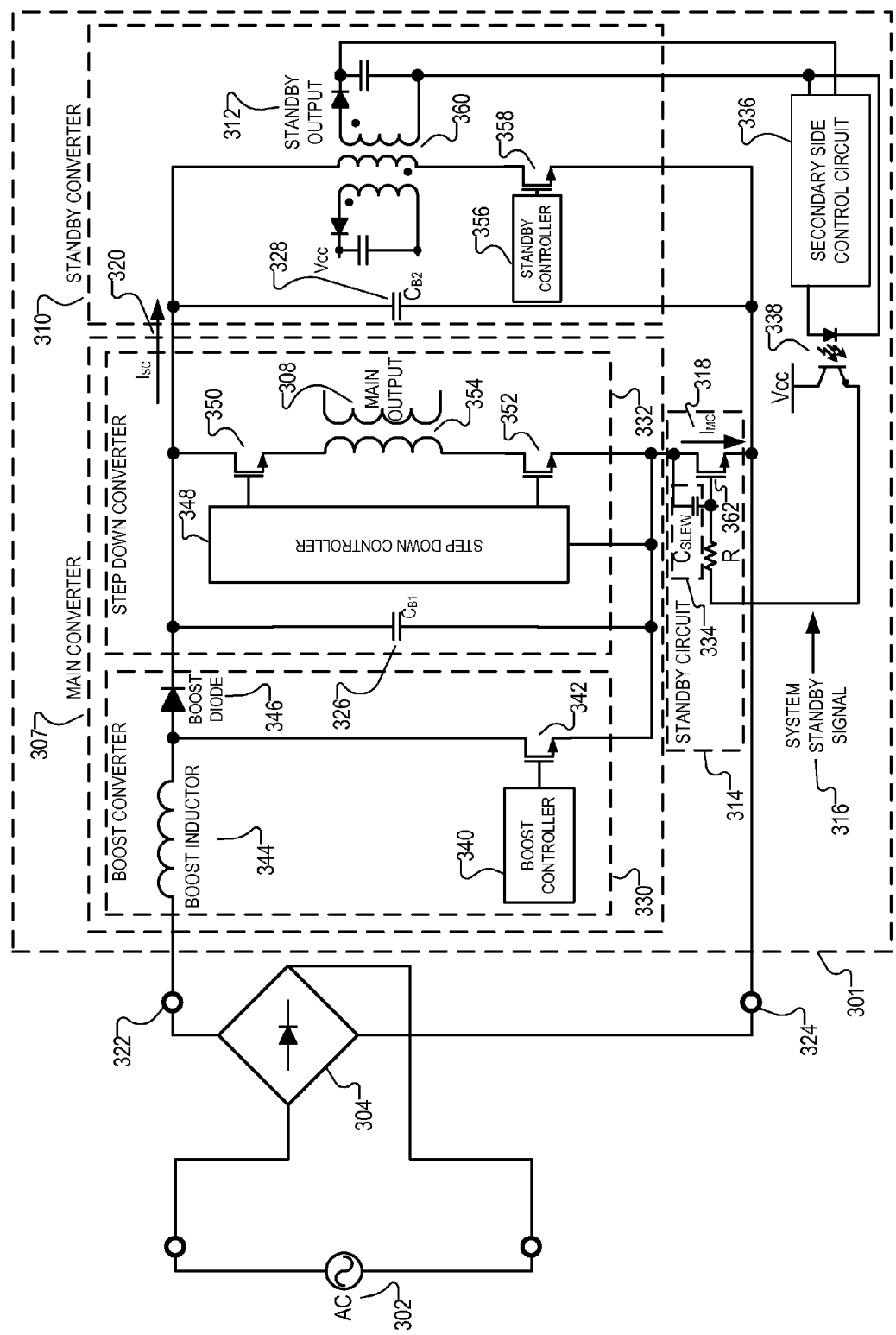
FIG. 3 is a schematic showing generally increased detail of another example of a power converter including a including a main converter, a standby converter, a standby circuit and a secondary side control circuit in accordance with the teachings of the present invention.

FIG. 3 is a schematic showing generally increased detail of another example of a power converter 301 in accordance with the teachings of the present invention. As shown in the depicted example, power converter 301 includes a main converter 307, a standby converter 310 and a standby circuit 314. Power converter 301 includes a dc input having input terminals 322 and 324 coupled to receive a dc signal from a rectifier 303, which is coupled to rectify an ac signal received from ac source 302.

It is appreciated that power converter 301 of FIG. 3 shares many similarities with power converter 201 of FIG. 2. To illustrate, in the particular example illustrated in FIG. 3, main converter 307 includes a boost converter 330 coupled to a step down converter 332 as shown. As shown in the illustrated example, boost converter 330 includes a boost inductor 344 coupled to dc input terminal 344, a boost diode 346 and a switch 342 as shown. A boost controller 340 is coupled control the switching of switch 342. As shown in the depicted example, boost converter 330 of main converter 307 is coupled to input terminal 324 through standby circuit 314 as shown.

In one example, step down converter 332 includes switches 350 and 352 coupled to an input winding of an energy transfer element 354 as shown. In the illustrated example, the main output 308 of power converter 301 is generated across the output winding of the energy transfer element 354. In the illustrated example, step down converter 332 also includes step down controller 348 to control the switching of switches 350 and 352 to control the transfer of energy from the dc input of the power converter 301 to main output 208 of power converter 301. In the illustrated example main bulk capacitor $C_{B1}$ 326 is also included in step down converter 332. As shown in the illustrated example, step down 332 of main converter 307 is coupled to input terminal 324 through standby circuit 314 as shown. As noted previously with reference to FIG. 2, power conversion stages 330 and 332 could also be configured in using a variety of power conversion topologies while still benefiting from the teachings of the present invention.

As shown in the example illustrated in FIG. 2, power converter 301 also includes standby converter 310, which is coupled to input terminal 322. In the specific example illustrated in FIG. 3, standby converter 310 is coupled to the input terminal 322 through main converter 307. It is appreciated that in another example, standby converter may be coupled directly input terminal 322. In one example, standby converter 310 includes switch 358 coupled to an input winding of an energy transfer element 360 as shown. In the illustrated example, the standby output 312 of power converter 301 is generated across the output winding of the energy transfer element 360. In the illustrated example, standby converter 310 also includes standby controller 356 to control the switching of switch 358 to control the transfer of energy from the dc input of the power converter 301 to standby output 312 of power converter 301. In the illustrated example, standby bulk capacitor $C_{B2}$ 328 is also included in step down converter 332. As shown in the illustrated example, standby converter 210 is directly coupled to input terminal 324 as shown.

As shown in the illustrated example, power converter 201 also includes standby circuit 314 that includes a switch 362 which is coupled to main converter 307 and input terminal 324 of the dc input of power converter 301 as shown. As shown in the depicted example, switch 362 is also coupled to receive through a resistor R a system standby signal 316, which indicates a normal operating condition or a standby operating condition of power converter 301. During a normal operating condition of power converter 301, main converter 307 is coupled to input terminal 324 through switch 362 in response to system standby signal 316 as shown. However, during a standby operating condition of the power converter 301, switch 362 decouples main converter 307, including main bulk capacitor $C_{B1}$ 226, from input terminal 324 in response to system standby signal 216. As a result, substantially all current $I_{MC}$ 318 through the main converter 307 from the dc input of the power converter is disabled during a standby operating condition of the power converter 301. However, during normal operation, substantially all current $I_{MC}$ 318 through the main converter 307 from the input of the power converter 301 is allowed to flow.

Since standby converter 310 is not coupled to the dc input of the power converter 301 through standby circuit 314, including standby bulk capacitor $C_{B2}$ 228, remains coupled to input terminal 324 during the standby operating condition. As a result, substantially all of the current $I_{SC}$ 320 through the standby converter 310 from the input of the power converter 301 is allowed to flow during both the normal operating condition as well as during the standby operating condition of power converter 301. As can be appreciated, by preventing the flow of current $I_{MC}$ 318 through main converter 307 from the input of the power converter 301 during a standby operating condition, the power consumption of power converter 301 is substantially reduced.

In the example illustrated in FIG. 3, power converter 301 also includes a secondary side control circuit 336, which is coupled to receive power from standby output 312 as shown. In operation, secondary side control circuit 336 is coupled to generate system standby signal 316 to indicate a normal operating condition or a standby operating condition of power converter 301. For instance, in one example, a low system standby signal 316 indicates a standby operating condition for power converter 301 while a high system standby signal indicates a normal operating condition for power converter 301. As shown in the depicted example, system standby signal 316 is coupled to be received by standby circuit 314 from secondary side control circuit 336 through an optocoupler 338. In the example, optocoupler 338 provides electrical isolation between the input side and output side of power converter 301 such that there is no dc current path between the input side and output side of power converter 301.

As shown in the example illustrated in FIG. 3, switch 362 of standby circuit 314 includes a transistor coupled between main converter 307 and input terminal 324 of the input of power converter 301. In one example, switch 362 is also used to perform in rush current limiting for main converter 307, including main bulk capacitor $C_{B1}$ 326. In the example, a smaller capacitance value is chosen for standby bulk capacitor $C_{B2}$ 328 such that no in rush current limiting is required for standby bulk capacitor $C_{B2}$ 328.

In the illustrated example, standby circuit includes a control circuit 334 coupled to switch 362 to provide in-rush current limiting for main bulk capacitor $C_{B1}$ 326 as power converter 301 transitions from a standby operating condition to a normal operating condition. In one example, control circuit 334 includes a capacitor $C_{SLEW}$ coupled between a gate and drain of an n-channel MOSFET switch 362. In operation, switch 362 is therefore coupled to be slew rate limited to control the dv/dt across main bulk capacitor $C_{B1}$ 326 by regulating the gate drive of switch 362 in response to the dv/dt across the switch 362 and therefore control the current flowing into the main bulk capacitor $C_{B1}$ 326. In one example, control circuit 334 is coupled to control a transistor switch 362 to operate in its saturation region to limit the in rush current into main bulk capacitor $C_{B1}$ 326 as power converter 301 transitions from the standby operating condition to the normal operating condition. In another example, a control circuit 334 may coupled to sense and control the current through switch 362 based on a sense FET or simple sense resistor signal. In another example, the transistor of switch 362 is configured to limit the in-rush current simply by arranging for the saturation current of the MOSFET to be lower than the max in-rush specification of main bulk capacitor $C_{B1}$ 326. With standby circuit 314 proving in rush current limiting for main bulk capacitor $C_{B1}$ 326 as discussed, it is appreciated that additional in rush current limiting circuitry is no longer needed in other parts of the power supply. It is appreciated that in other examples, switch 362 could be a bipolar transistor, JFET or Gallium Nitride transistor or the like while benefiting from the teachings of the present invention. It is appreciated that with other types of switch 362, the control circuit 334 and system standby signal 316 could be modified accordingly to provide signals appropriate to the type of switch 362 being employed.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter, comprising:
    a main converter coupled to a dc input of the power converter to control a transfer of energy from the input of the power converter to a main output of the power converter;
    a standby converter coupled to the dc input of the power converter to control a transfer of energy from the dc input of the power converter to a standby output of the power converter during a standby operating condition of the power converter; and
    a standby circuit coupled to the dc input of the power converter and coupled to the main converter, the standby circuit to decouple the main converter from the dc input of the power converter during the standby operating condition of the power converter.

2. The power converter of claim 1 further comprising a main bulk capacitor included in the main converter, the main bulk capacitor coupled to the dc input of the power converter and coupled to the standby circuit, the standby circuit to decouple the main bulk capacitor from the dc input of the power converter during the standby operating condition of the power converter.

3. The power converter of claim 2 further comprising a standby bulk capacitor included in the standby converter, the standby bulk capacitor coupled to the dc input of the power converter, the standby bulk capacitor to remain coupled to the dc input of the power converter during the standby operating condition of the power converter.

4. The power converter of claim 1 wherein the standby circuit comprises a switch coupled to the main converter and coupled to the power converter input, the switch to decouple the main converter from the dc input of the power converter during the standby operating condition of the power converter.

5. The power converter of claim 4 wherein the switch comprises a transistor coupled to the main converter and coupled to the power converter dc input, wherein the transistor is coupled to operate in its saturation region as the power converter transitions from the standby operating condition to a normal operating condition.

6. The power converter of claim 4 wherein the standby circuit includes a standby switch control circuit coupled to the switch to control a current through the switch to limit an in-rush current into a main bulk capacitor included in the main converter as the power converter transitions from the standby operating condition to a normal operating condition.

7. The power converter of claim 6 wherein the standby switch control circuit coupled to the switch comprises a capacitor coupled to a gate terminal and a drain terminal of the switch.

8. The power converter of claim 1 further comprising a secondary side control circuit coupled to the standby output of the power converter and coupled to the standby circuit, the secondary side control circuit coupled to generate a system standby signal coupled to be received by the standby circuit to indicate the standby operating condition of the power converter.

9. The power converter of claim 8 further comprising an optocoupler coupled between the secondary side control circuit and the standby circuit.

10. The power converter of claim 1 wherein the main converter comprises a step down converter coupled between the dc input of the power converter and the main output of the power converter.

11. The power converter of claim 10 wherein the main converter further comprises a boost converter coupled between the dc input of the power converter and the step down converter.

12. The power converter of claim 1 wherein the standby converter is coupled to the dc input of the power converter through the main converter.

13. The power converter of claim 1 further comprising a rectifier coupled to receive an ac signal from an ac source, wherein the rectifier is coupled to generate a rectified signal at the dc input of the power converter.

14. A method for controlling a power converter, comprising:
    switching a power switch of a main converter of a power converter to control a transfer of energy from a dc input of a power converter to a main output of the power converter during a normal operating condition of the power converter;
    disabling substantially all current through the main converter of the power converter from the dc input of the power converter during a standby operating condition of the power converter; and
    switching a power switch of a standby converter of the power converter to control a transfer of energy from the dc input of the power converter to a standby output of the power converter during the normal operating condition and during the standby operation condition of the power converter.

15. The method for controlling the power converter of claim 14 further comprising disabling a main bulk capacitor included in the main converter of the power converter from receiving substantially all current from the dc input of the power converter during the standby operating condition of the power converter.

16. The method for controlling the power converter of claim 15 further comprising allowing a standby bulk capacitor included in the standby converter of the power converter to continue receiving current from the dc input of the power converter during the normal operating condition and the standby operating condition of the power converter.

17. The method for controlling the power converter of claim 15 further comprising limiting an in-rush current into the main bulk capacitor included in the main converter of the power converter as the power converter transitions from the standby operating condition to the normal operating condition.

18. The method for controlling the power converter of claim 17 wherein limiting the in-rush current into the main bulk capacitor included in the main converter of the power converter comprises operating a transistor coupled to the input of a power converter and the main converter in its saturation region as the power converter transitions from the standby operating condition to the normal operating condition.

19. The method for controlling the power converter of claim 17 wherein limiting the in-rush current into the main bulk capacitor included in the main converter of the power converter comprises controlling a slew rate of a transistor coupled to the dc input of a power converter and the main converter as the power converter transitions from the standby operating condition to the normal operating condition.

20. The method for controlling the power converter of claim 14 further comprising generating a system standby signal with a secondary side control circuit coupled to the standby output of the power converter to indicate the standby operating condition to a standby circuit coupled to the dc input of a power converter and the main converter.

21. The method for controlling the power converter of claim 20 further comprising electrically isolating the secondary side control circuit from the standby circuit.

* * * * *